United States Patent
Van Dijk

(10) Patent No.: US 11,086,091 B2
(45) Date of Patent: Aug. 10, 2021

(54) SIGHT GLASS

(71) Applicant: EATON INTELLIGENT POWER LIMITED, Dublin (IE)

(72) Inventor: Marcel Van Dijk, CH Enschede (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 284 days.

(21) Appl. No.: 16/332,831

(22) PCT Filed: Sep. 14, 2017

(86) PCT No.: PCT/EP2017/073171
§ 371 (c)(1),
(2) Date: Mar. 13, 2019

(87) PCT Pub. No.: WO2018/050762
PCT Pub. Date: Mar. 22, 2018

(65) Prior Publication Data
US 2019/0361192 A1    Nov. 28, 2019

(30) Foreign Application Priority Data
Sep. 14, 2016    (GB) .................... 1615574

(51) Int. Cl.
*G02B 7/02* (2021.01)
*G02B 7/00* (2021.01)
*H01H 1/00* (2006.01)
*H01H 9/02* (2006.01)

(52) U.S. Cl.
CPC ..... *G02B 7/007* (2013.01); *H01H 2001/0021* (2013.01); *H01H 2009/0292* (2013.01)

(58) Field of Classification Search
CPC . G02B 7/00; G02B 7/007; G02B 7/02; G02B 23/16; G02B 23/24; G02B 23/2476; G02B 23/2492
USPC ....... 359/367, 503, 504, 513, 694, 819, 827, 359/828, 409, 811
See application file for complete search history.

(56) References Cited

U.S. PATENT DOCUMENTS

2004/0227987 A1    11/2004  Holliday et al.
2005/0279317 A1*   12/2005  Leasure .................. F01M 1/16
                                                         123/195 R

FOREIGN PATENT DOCUMENTS

CN    204885850 U    12/2015
DE    29516383 U1    12/1995

OTHER PUBLICATIONS

English (Machine) translation of the reference CN 204885850.*
(Continued)

*Primary Examiner* — Thong Q Nguyen
(74) *Attorney, Agent, or Firm* — Leydig, Voit & Mayer, Ltd.

(57) ABSTRACT

A sight glass for mounting in a hole, provided with radially inwardly extending protrusions, in a sheet material wall of a housing, for example a switchgear housing, includes: a body with a mounting surface and a cylindrical wall arranged on the mounting surface and extending perpendicularly from the mounting surface; a plurality of L-shaped slots in the radially outer surface of the cylindrical wall; and a gasket arranged on the mounting surface, the gasket enclosing the cylindrical wall. The body and cylindrical wall are of a monolithic transparent material.

9 Claims, 3 Drawing Sheets

(56) References Cited

OTHER PUBLICATIONS

Anonymous, "A08042-TX1510-Pump-General-Torque-Specs," N/A, May 31, 2011, XP055429271, URL: http://www.allpartsinc.com/media/attachments/DTH3635/a08042-ipd.pdf.
Anonymous: "A08919 Indicator Oil Level Sight Glass," N/A Jun. 9, 2012, XP055429273, URL: http://www.allpartsinc.com/indicator-oil-level-sight-glass-a08919.html.

* cited by examiner

SIGHT GLASS

CROSS-REFERENCE TO PRIOR APPLICATIONS

This application is a U.S. National Phase application under 35 U.S.C. § 371 of International Application No. PCT/EP2017/073171, filed on Sep. 14, 2017, and claims benefit to British Patent Application No. GB 1615574.9, filed on Sep. 14, 2016. The International Application was published in English on Mar. 22, 2018 as WO 2018/050762 under PCT Article 21(2).

FIELD

The invention relates to a sight glass for mounting in a hole, in particular for mounting in a sheet material wall of a housing, for example switchgear housing.

BACKGROUND

Switchgear housing, in which for example medium and high voltage equipment is housed, needs to comply with a certain international protection rating (IP-rating), in particular needs to be airtight. Furthermore, the housing needs to be able to withstand a sudden pressure increase as a result of an electrical fault. Only designated blowout valves in the housing should open to relieve the pressure in the housing.

To inspect the switchgear in the housing, it is known to provide sight glasses in the wall of the housing. For example US 2004227987 discloses a sight glass, which is airtight mounted to a wall of a housing and could withstand internal pressure. However, the construction of this embodiment is complicated, requires a plurality of parts and mounting this prior art sight glass in the wall takes a substantial amount of time.

Furthermore, due to the number of stacked parts of this prior art sight glass, the airtightness is difficult to ensure, as at each contact surface there could occur a leak.

SUMMARY

In an embodiment, the present invention provides a sight glass for mounting in a hole, provided with radially inwardly extending protrusions, in a sheet material wall of a housing, the sight glass comprising: a body with a mounting surface and a cylindrical wall arranged on the mounting surface and extending perpendicularly from the mounting surface; a plurality of L-shaped slots in the radially outer surface of the cylindrical wall; and a gasket arranged on the mounting surface, the gasket enclosing the cylindrical wall, wherein the body and cylindrical wall are comprised of a monolithic transparent material.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
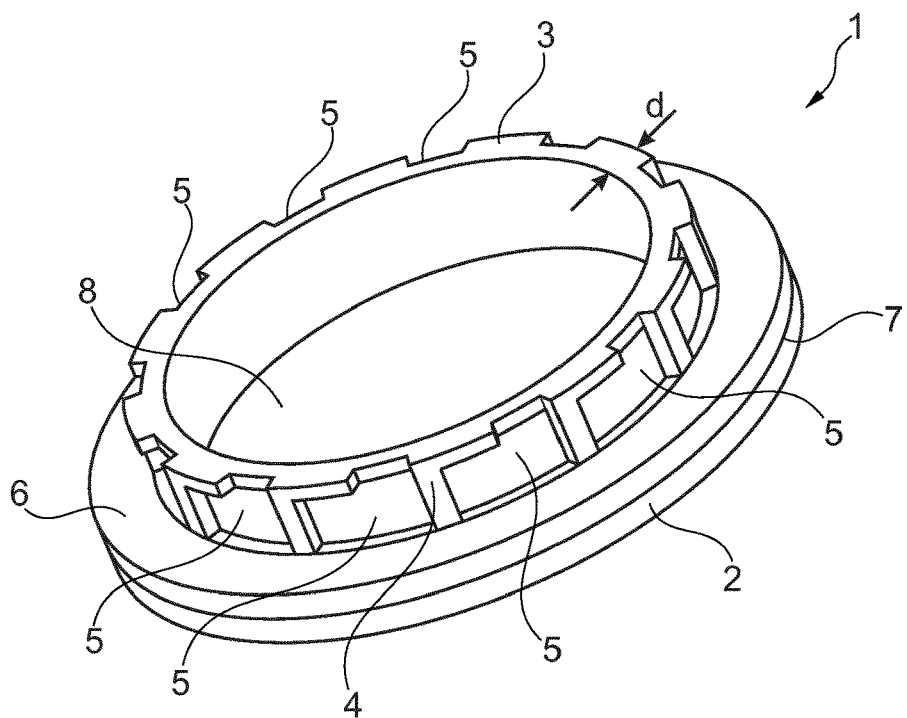
FIG. 1 shows a perspective view of an embodiment of a sight glass according to the invention.

Embodiments of the present invention reduce the above mentioned disadvantages.

In an embodiment, the present invention provides a sight glass, which comprises a body with a mounting surface and a cylindrical wall arranged on the mounting surface and extending perpendicular from said mounting surface, wherein a number of L-shaped slots are provided in the radially outer surface of the cylindrical wall, wherein a gasket is arranged on the mounting surface and encloses the cylindrical wall, and wherein the body and cylindrical wall are of a monolithic transparent material.

The L-shaped slots arranged on the radially outer surface provide, in combination with a hole, provided with radially inwardly extending protrusions, a bayonet mount. Due to the bayonet mount, the sight glass can be quickly mounted in a sheet material wall of a housing, simply by inserting the cylindrical wall part into the hole, such that the protrusions of the hole slide in the L-shaped slots and then rotating the sight glass, such that the protrusions of the hole are locked in the L-shaped slots.

An additional advantage of the bayonet mount of the sight glass is that the gasket is compressed upon mounting the sight glass in the hole, which provides for a reliable airtight seal between the housing wall and the body of the sight glass.

The body and cylindrical wall of the sight glass are embodied as a single, monolithic part of a transparent material. By embodying the body and wall as one part, the strength of the part is optimized. Typically, such part can be manufactured by injection moulding, which allows for easy integration of the L-shaped slots in the cylindrical wall.

For providing the bayonet mount, the L-shaped slots have a first leg extending parallel to the axis of the cylindrical wall and have a second leg extending tangentially to the cylindrical wall.

In a preferred embodiment of the sight glass according to the invention, the gasket is fused to the monolithic transparent material, such as obtained by 2K injection moulding.

By fusing the gasket to the monolithic transparent material, the airtightness between the gasket and the body is maximized. Furthermore, during manufacturing, the gasket can easily be provided by 2K injection moulding, wherein a separate, for example thermoplastic material, is injected into the mould together with the transparent material. The thermoplastic material provides the gasket, while the transparent material provides the monolithic body with cylindrical wall. Due to the 2K injection moulding, the gasket will be fused to the transparent material.

In another embodiment of the sight glass according to the invention a central part of the body has a smaller thickness than the part of the body surrounding the central part.

By reducing the thickness of the central part, the vision through the transparent material is improved, while the thickness surrounding the central part can have a thickness suitable to provide sufficient structural strength for the bayonet mount.

In another preferred embodiment of the sight glass according to the invention the body has a second surface opposite of and substantially parallel to the mounting surface, wherein a number of holes are arranged in the second surface for coupling with a mounting tool.

A mounting tool with pins can be positioned over the sight glass with the pins extending into the holes. With the tool, the sight glass can then be easily inserted into the hole in the wall and can be easily rotated to lock the sight glass in the hole.

Preferably, the body is disc shaped and the holes are arranged evenly distributed along the periphery of the disc shaped body.

In yet another embodiment of the sight glass according to the invention the gasket is provided with widening extensions, which extensions extend into the body.

The extensions provide for an additional mechanical mounting of the gasket onto the body, which contributes to a high resistance against pressure differences.

In still a further embodiment of the sight glass according to the invention some of the L-shaped slots is provided in radial direction at the end wall of the slot with a notch. This notch ensures that the protrusions of a hole, in which a sight glass is arranged, do not extend fully against the end wall. The typically metal, and often sharp, protrusions could otherwise cause stresses in the plastic of the sight glass, which could lead to excessive wear or even rupture of the plastic.

The invention also relates to a combination of a sight glass according to the invention and a sheet material wall of a housing, wherein a hole is provided in the sheet material wall, which hole is provided with radially inwardly extending protrusions and wherein the sight glass is mounted in the hole and the protrusions extend in the L-shaped slots.

Finally, the invention also relates to a combination of a sight glass with holes in the second surface and a mounting tool, wherein the mounting tool comprises a body with a mounting surface and a number of pins extending perpendicular from the mounting surface, wherein the position and number of the pins corresponds with the number of holes in the second surface of the body of the sight glass.

FIG. 1 shows a sight glass 1 according to the invention. The sight glass 1 has a disc-shaped body 2, on which a cylindrical wall 3 with thickness d is arranged. On the radially outer surface 4 of the cylindrical wall 3 L-shaped slots 5 are provided.

A gasket 6 is provided on the mounting surface 7 of the body 2. This gasket 6 encloses the cylindrical wall 3.

Within the cylindrical wall 3 a central part 8 is provided and which has preferably a smaller thickness than the surrounding part of the body 2. The central part 8, being part of a monolithic transparent material functions as the window of the sight glass. The cylindrical wall 3 is also part of the monolithic transparent material, but provides mainly strength for the L-shaped slots to provide a bayonet mount.

Figure 2:
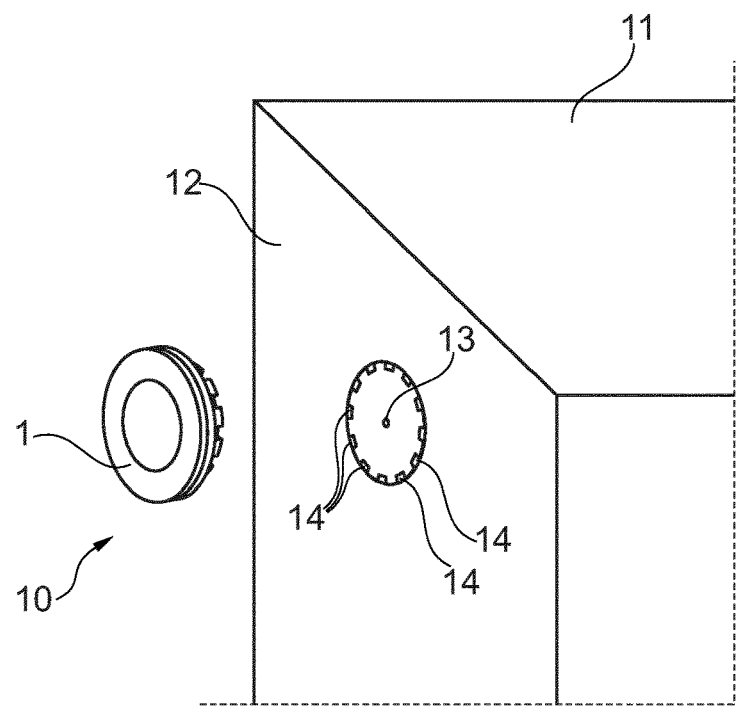
FIG. 2 shows a combination according to the invention of a sight glass and a housing wall.

FIG. 2 shows a combination 10 according to the invention. The combination 10 has a housing 11 with a sheet material wall 12 in which a hole 13 is arranged. The hole 13 is provided along its edge with protrusions 14, which cooperate with the L-shaped slots 5 of the sight glass 1.

Figure 3:
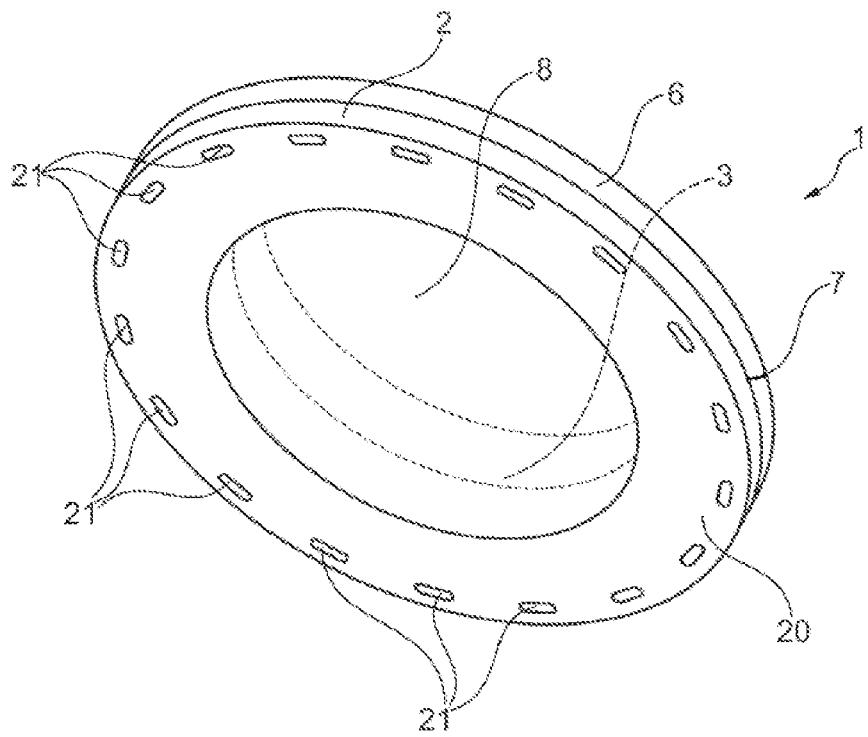
FIG. 3 shows a perspective view of the reverse side of the embodiment of FIG. 1.

FIG. 3 shows the sight glass 1 of FIG. 1 of the reverse side. The sight glass 1 has a second surface 20 on the body 2, which is substantially parallel to the mounting surface 7.

The second surface 20 is provided along the peripheral edge with a number of holes 21. With dashed line, the cylindrical wall 3 is shown through the transparent central part 8.

Figure 4:
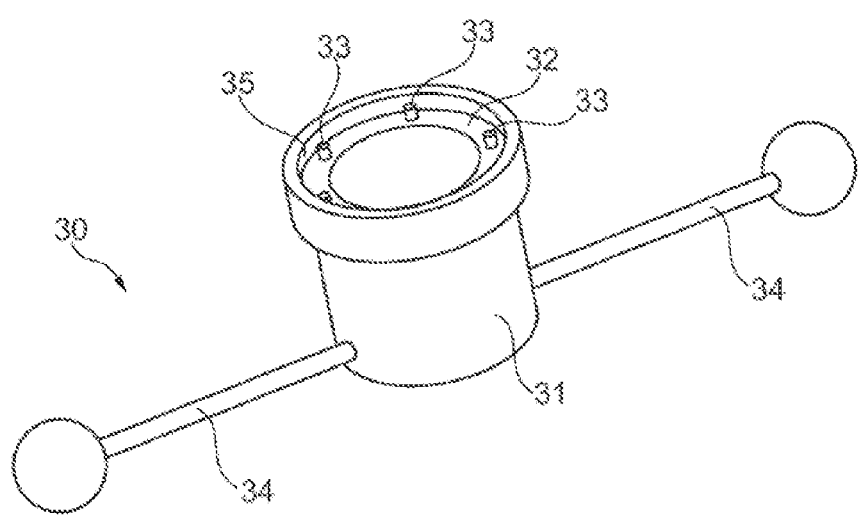
FIG. 4 shows a tool according to the invention for mounting a sight glass according to the invention.

FIG. 4 shows a mounting tool 30. The mounting tool 30 has a body 31 with a mounting surface 32. A number of pins 33 are arranged on the mounting surface 32 and extend perpendicular from this mounting surface 32. The pins 33 are positioned and dimensioned such that they can be inserted in the holes 21 on the second surface 20 of the sight glass 1.

Two opposite handles 34 are attached to the body 31 to facilitate the rotating of the tool 30, when coupled to a sight glass 1. The mounting surface 32 is furthermore provided with a upstanding wall 35 along the periphery of the mounting surface 32 to easily center a sight glass 1 with respect to the tool 30.

Figure 5:
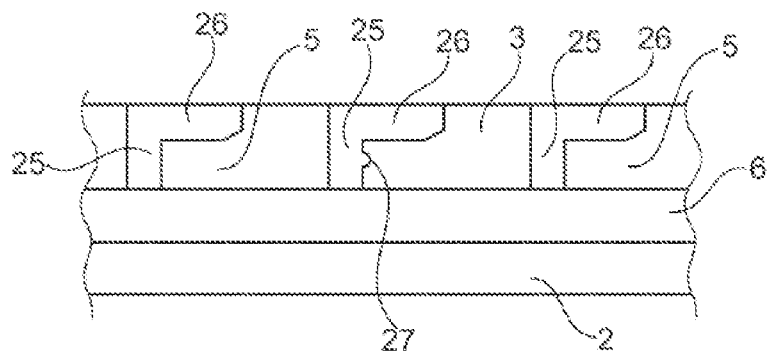
FIG. 5 shows a side view of the embodiment of FIG. 1.

FIG. 5 shows a side view of the embodiment of FIG. 1. The L-shaped slots 5 are each bordered by an upstanding wall 25 and a horizontal wall 26. In some of the L-shaped slots 5, for example in two diametrically opposed L-shaped slots 5, the upstanding wall 25 is provided with a notch 27. This notch 27 ensures that the protrusions 14 of a hole 13, in which a sight glass is arranged, do not extend fully against the upstanding wall 25. The typically metal, and often sharp, protrusions 14 could otherwise cause stresses in the plastic of the sight glass, which could lead to excessive wear or even rupture of the plastic.

Figure 6:
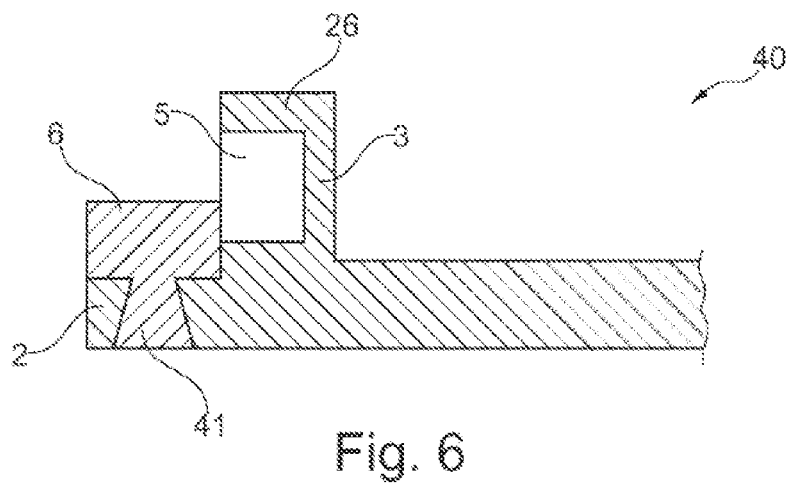
FIG. 6 shows a cross-sectional view of a variant on the embodiment of FIG. 1.

FIG. 6 shows a cross-sectional view of a variant on the embodiment of FIG. 1. The same features are designated with the same reference signs.

In this embodiment 40 the gasket 6 is provided with tapering extensions 41, which extend into holes of the body 2. Although the gasket 6 is typically 2K-injection moulded with the body 2 and in use clamped between the body 2 and a housing, the tapering extensions 41 provide for an additional mechanical mounting of the gasket 6 on the body 2. This further ensures that upon a pressure difference, the gasket is not blown out and the sight glass loses its airtightness.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sight glass for mounting in a hole, provided with radially inwardly extending protrusions, in a sheet material wall of a housing, the sight glass comprising:
   - a body with a mounting surface and a cylindrical wall arranged on the mounting surface and extending perpendicularly from the mounting surface;
   - a plurality of L-shaped slots in a radially outer surface of the cylindrical wall; and
   - a gasket arranged on the mounting surface, the gasket enclosing the cylindrical wall,
   - wherein the body and cylindrical wall comprise a monolithic transparent material,
   - wherein the gasket is fused to the monolithic transparent material, and
   - wherein the gasket comprises widening extensions, which extensions extend into the body.

2. The sight glass according to claim 1, wherein a central part of the body has a smaller thickness than a part of the body surrounding the central part.

3. The sight glass according to claim 1, wherein the body has a second surface opposite of and substantially parallel to the mounting surface, and
   - wherein a plurality of holes are arranged in the second surface and are configured for coupling with a mounting tool.

4. The sight glass according to claim 3, wherein the body is disc shaped and the holes are arranged evenly distributed along a periphery of the disc shaped body.

5. A combination, comprising:
   - the sight glass according to claim 3; and
   - a mounting tool, the mounting tool comprising a body with a mounting surface and a number of pins extending perpendicularly from the mounting surface,
   - wherein a position and number of the pins corresponds with a number of holes in the second surface of the body of the sight glass.

6. The sight glass according to claim 1, wherein each of at least two of the plurality of L-shaped slots is provided with a notch in a radial direction at an end wall of the respective slot.

7. A combination, comprising:
   - the sight glass according to claim 1; and
   - a sheet material wall of a housing,
   - wherein a hole is provided in the sheet material wall, which hole is provided with radially inwardly extending protrusions, and
   - wherein the sight glass is mounted in the hole and the protrusions extend in the L-shaped slots.

8. The sight glass according to claim 1, wherein the gasket is fused to the monolithic transparent material using 2K injection moulding.

9. The sight glass according to claim 1, wherein the housing is a switchgear housing.

* * * * *